April 21, 1925.
O. L. SCROGGINS
1,534,994
METHOD AND MEANS TO INDICATE THE THEFT OF AUTOMOBILES AND THE LIKE
Filed June 5, 1924
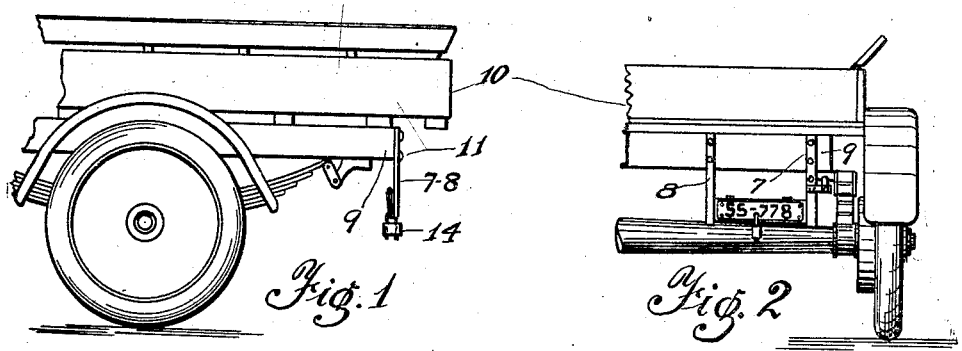
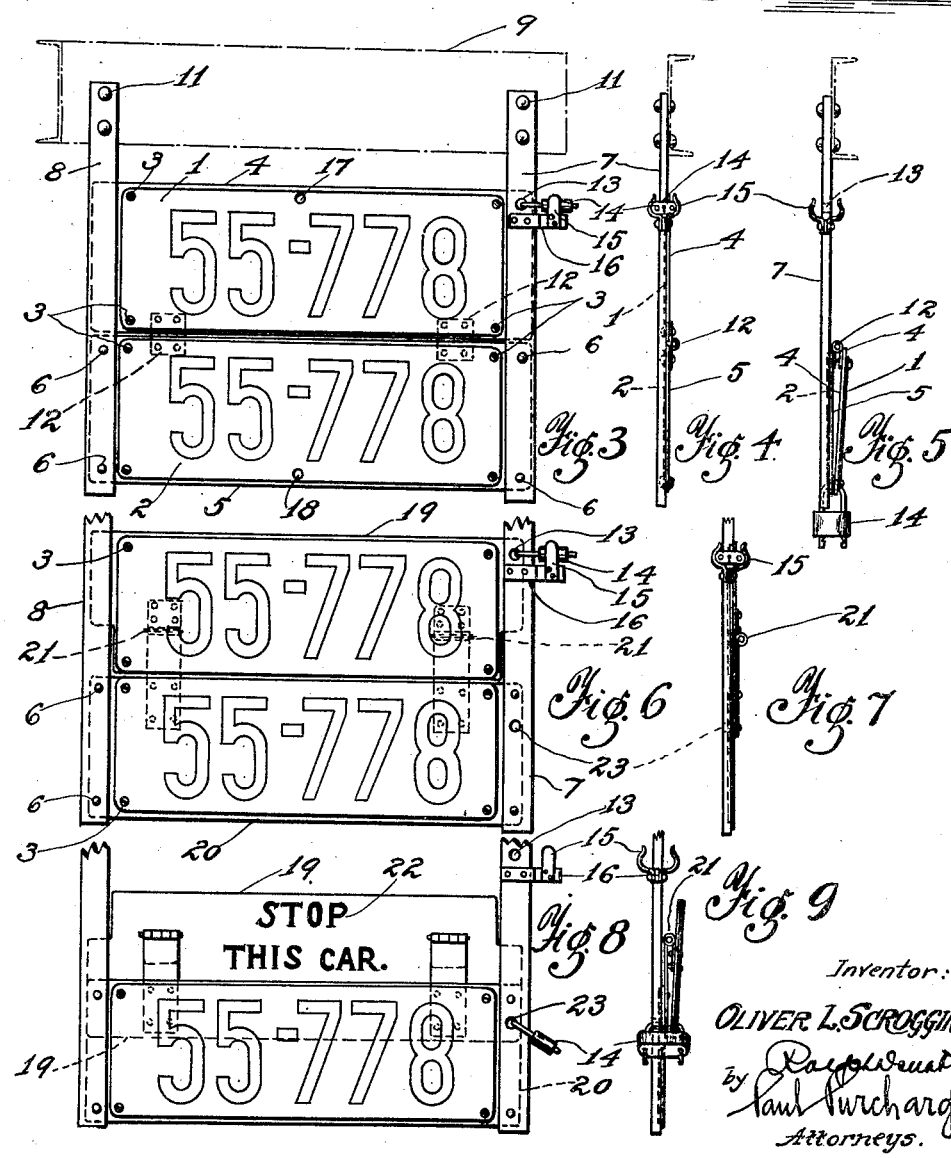
Inventor:
OLIVER L. SCROGGINS
Attorneys.

Patented Apr. 21, 1925.

1,534,994

UNITED STATES PATENT OFFICE.

OLIVER L. SCROGGINS, OF PITTSBURGH, PENNSYLVANIA.

METHOD AND MEANS TO INDICATE THE THEFT OF AUTOMOBILES AND THE LIKE.

Application filed June 5, 1924. Serial No. 717,988.

*To all whom it may concern:*

Be it known that I, OLIVER L. SCROGGINS, a citizen of the United States, residing at Pittsburgh, county of Allegheny, and State of Pennsylvania, have invented certain new and useful Improvements in Methods and Means to Indicate the Theft of Automobiles and the like, of which the following is a specification.

This invention relates to methods and means to prevent the unlawful use, or theft, of automobiles or other vehicles.

One of the main objects of this invention is to provide a simple precautionary method for the protection of automobiles against theft or unlawful use. Another object is to provide a tell-tale device which is simple in operation and which can be applied to all types of self propelled, or other kinds of, vehicles which are required by law to carry so-called license-plates. Additional features and advantages of this invention will appear from the following description considered in connection with the accompanying drawing forming a part of this application and in which:

Fig. 1 is a partial side elevation of an automobile truck provided with my tell-tale device.

Fig. 2 is a fractional end view of Fig. 1.

Fig. 3 is an enlarged view showing the front elevation of a double license-plate used in my system of theft protection and applied preferably at the rear of an automobile.

Fig. 4 is a side view of Fig. 3.

Fig. 5 is also a side view of Fig. 3, showing the upper license-plate turned backwards to render it invisible from the rear of the automobile.

Fig. 6 is an enlarged front elevation of a modified arrangement for the double license-plate.

Fig. 7 is an end view of Fig. 6.

Fig. 8 is a front elevation of the modified construction showing the upper license-plate folded backwards.

Fig. 9 is an end-view of Fig. 8.

In my system to indicate, or prevent, the unlawful use or theft of a vehicle, the principal idea is to use, preferably at the rear of said vehicle, two license-plates bearing identical license-numbers and to provide means whereby one of said plates may be hidden, thus exposing but one plate to the public, which condition is used as an indication that the vehicle is not used by the lawful owner or driver.

Referring to Figs. 1 to 5 inclusive, two license-plates 1 and 2 are secured by means of screws 3, upon their respective base-plates 4 and 5 placed preferably one above the other, as shown in the drawing. The lower base-plate 5 is fastened permanently by means of bolts or rivets 6 to the brackets 7 and 8, which in turn are secured to the frame 9 at the rear of the vehicle 10 by means of the rivets 11. The upper base-plate 4 is secured to the lower base-plate 5 by means of the hinges 12 which permit the upper base-plate, and its license-plate, to be folded backwards so as to be invisible to the public looking toward the rear end of the vehicle.

When the vehicle is being driven, it is intended that both license-plates be exposed. In order to maintain the upper license-plate in its running, or vertical, position, registering apertures 13 are provided respectively in the upper right hand corner of the base-plate 4 and in the bracket 7, and through these apertures a padlock 14, of any suitable type, is inserted. The latter is preferably supported in a horizontal position by means of a spring-clamp 15 secured to a short horizontal support 16 riveted, or otherwise secured, to the bracket 7.

When the vehicle is not to be run for a reasonable time, as may occur when it is left standing in the road while the driver has to absent himself to attend to other business, the upper license plate is folded into the invisible position and is locked therein by inserting the padlock 14 through the apertures 17 and 18 which are so disposed in the base-plates as to register when the upper plate is folded down, as shown in Figs. 1, 2 and 5.

Any person intending to run the vehicle in the absence of the owner or driver, and with the upper license-plate in folded position, would immediately attract the attention and suspicion of the constabulary or the public which, it is intended, shall be previously educated to this system of protection against theft of automobiles.

The modified construction illustrated in Figs. 6 to 9 differs from the one described above in that the upper base-plate 19 is secured to the lower base-plate 20 by means of hinges 21 reaching up into the upper base-plate, so that when the latter is folded backwards a portion of the reverse side of the upper base-plate will appear above the lower base-plate. Any suitable notice 22, such as the one shown in Fig. 8 may be placed on this extension to give to the constabulary and the public the necessary warning.

As will be noted, the lower portion of the right and left hand sides of the upper base-plate must be cut away a sufficient amount so as not to interfere with the brackets 7 and 8 when said base-plate is folded backwards. Also, the aperatures 17 and 18, shown in Fig. 3, may be dispensed with by providing in the bracket 7 and the lower base-plate 20 a suitably disposed aperture 23 through which the padlock may be inserted to hold the upper base-plate in its folded position.

All parts in this modified construction which have not undergone any changes have been marked with the same identification numbers as used in the construction first described.

The principal advantage of the modified construction is that it enables to place upon the reverse side of the upper base-plate any desired warning which will be readily understood by everybody without prior education as to the operation of my theft preventing system.

Referring to the foregoing, the operation of my system will be readily understood without further detailed description; suffices to say that, when the vehicle is running, both license-plates are to be visible and that when leaving the vehicle for some time, the driver lowers the upper license-plate, thereby indicating to the public that the vehicle is not run rightfully.

As will be understood, as suggested herein, there may be slight changes made in the construction and arrangement of the details of my invention without departing from the field and scope of the same, and I intend to include all such variations, as fall within the scope of the appended claims, in this application in which the preferred forms only of my invention have been disclosed.

What I claim is:—

1. In a device adapted to indicate the theft of a vehicle, the combination of a pair of license-plates mounted rearwardly of said vehicle and bearing identical license-numbers; common supports for the said license-plates; one of said plates being permanently secured to said supports and the other plate being hingedly connected to said stationary license-plate in a manner to permit a part of the reverse side of said hinged plate to extend above said stationary plate when in folded position; a padlock to secure said hinged plate in folded position; means to support said padlock in horizontal position and adapted to prevent the rattling thereof, and a warning notice positioned on the reverse side of said hinged plate extending above said stationary license-plate.

2. In a device adapted to indicate the theft of a vehicle, the combination of a pair of license-plates mounted rearwardly of said vehicle and bearing identical license-numbers; common supports for said license-plates; one of said plates being permanently secured to said supports and the other plate being hingedly connected to said stationary license-plate in a manner to permit a part of the reverse side of said hinged plate to extend above said stationary plate when in folded position; a padlock to secure said hinged plate in folded position; means to support said padlock in horizontal position; resilient means mounted upon said last named support and adapted to prevent the rattling of said padlock, and a warning notice positioned on the reverse side of said hinged plate extending above said stationary license-plate.

In testimony whereof, I affix my signature.

OLIVER L. SCROGGINS.